US008099670B2

(12) United States Patent
Forlenza et al.

(10) Patent No.: US 8,099,670 B2
(45) Date of Patent: *Jan. 17, 2012

(54) SYSTEMS AND MEDIA FOR UPDATING AN INSTANT MESSAGING SYSTEM

(75) Inventors: Randolph Michael Forlenza, Austin, TX (US); John Paul Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 856 days.

This patent is subject to a terminal disclaimer.

(21) Appl. No.: 12/127,970

(22) Filed: May 28, 2008

(65) Prior Publication Data
US 2009/0063677 A1 Mar. 5, 2009

Related U.S. Application Data

(63) Continuation of application No. 10/926,590, filed on Aug. 26, 2004, now Pat. No. 7,412,657.

(51) Int. Cl.
*G06F 3/00* (2006.01)
*G06F 3/048* (2006.01)

(52) U.S. Cl. .................. 715/758; 715/772; 715/751

(58) Field of Classification Search .................. 715/751, 715/758, 772
See application file for complete search history.

(56) References Cited

U.S. PATENT DOCUMENTS

| 5,428,784 | A  | 6/1995  | Cahill, Jr. |
| 6,631,412 | B1 | 10/2003 | Glasser et al. |
| 6,640,230 | B1 | 10/2003 | Alexander et al. |
| 6,691,162 | B1 | 2/2004  | Wick |
| 6,711,608 | B1 | 3/2004  | Ogilvie |
| 7,043,530 | B2 | 5/2006  | Isaacs et al. |
| 7,084,754 | B2 | 8/2006  | Benejam et al. |
| 7,334,021 | B1 | 2/2008  | Fletcher |
| 7,412,657 | B2 | 8/2008  | Forlenza et al. |
| 2002/0049709 | A1 | 4/2002 | Miyasaki et al. |
| 2002/0077080 | A1 | 6/2002 | Greene |
| 2002/0143916 | A1 | 10/2002 | Mendiola et al. |
| 2003/0046296 | A1 | 3/2003 | Doss et al. |
| 2004/0010808 | A1 | 1/2004 | deCarmo |

(Continued)

OTHER PUBLICATIONS

Nortel Networks, "Multimedia PC Client User Guide", http://it.com.itd.umuch.edu/networkengin/seasler/MCS/Setup;/NortelDocumentation/MMPCC%User%%20Guide.pdf, Dec. 2003, pp. 1-68.

(Continued)

*Primary Examiner* — Adam M Queler
*Assistant Examiner* — Andrea Long
(74) *Attorney, Agent, or Firm* — Schubert Law Group; Mark C. Vallone

(57) ABSTRACT

Systems and media for updating an instant messaging system on a network are disclosed. More particularly, hardware and/or software for updating status indicators such as 'away' messages of an instant messaging system are disclosed. Embodiments include determining that a change in status of the user has occurred and automatically transmitting an indication of the change in status to instant messenger system manager via a network. Embodiments include determining that a change in status of the user has occurred based on receiving an indication that the user's status has changed, such as from user input on a keyboard, mouse, etc. Other embodiments include determining that a change in status has occurred based on determining that the user's status has changed based on an electronic calendar, expiration of a time period, etc.

10 Claims, 7 Drawing Sheets

U.S. PATENT DOCUMENTS

| | | |
|---|---|---|
| 2004/0153506 A1 | 8/2004 | Ito et al. |
| 2004/0162882 A1 | 8/2004 | Mora |
| 2004/0203659 A1 | 10/2004 | Mikan |
| 2005/0080863 A1 | 4/2005 | Daniell |
| 2005/0080867 A1 | 4/2005 | Malik et al. |
| 2005/0114777 A1 | 5/2005 | Szeto |
| 2005/0198545 A1 | 9/2005 | Wieck et al. |
| 2006/0048061 A1 | 3/2006 | Forlenza et al. |
| 2006/0190117 A1 | 8/2006 | Weczorek et al. |

OTHER PUBLICATIONS

Molly Wood, "CNET Imagines the Perfect E-Mail Client", Apr. 3, 2002, pp. 1-6.

Non-final office action dated Jun. 14, 2007 for U.S. Appl. No. 10/926,590.

Final office action dated Nov. 26, 2007 for U.S. Appl. No. 10/926,590.

Notice of Allowance dated May 1, 2008 for U.S. Appl. No. 10/926,590.

SYSTEMS AND MEDIA FOR UPDATING AN INSTANT MESSAGING SYSTEM

CROSS-REFERENCES TO RELATED APPLICATIONS

Pursuant to 35 USC §120, this continuation application claims priority to and benefit of U.S. patent application Ser. No. 10/926,590, entitled "SYSTEMS, METHODS, AND MEDIA FOR UPDATING AN INSTANT MESSAGING SYSTEM", filed on Aug. 26, 2004, now U.S. Pat. No. 7,412,657 the disclosure of which is incorporated herein in its entirety for all purposes.

FIELD OF INVENTION

The present invention is in the field of data processing systems and, in particular, to systems and media for updating the status of a user on an instant messaging system on a network by automatically updating a status indicator when a change in the user's status has occurred.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300, ThinkCentre, ThinkPad, Aptiva, and IntelliStation series.

The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet. E-mail, which allows a user to transmit a message to another user, is one of the more popular uses of the Internet, and its use continues to increase.

Another application that continues to increase in popularity is instant messaging (IM). IM systems allow two or more users on computer systems such as PCs or mobile computing devices to exchange messages in real-time (or near real-time). IM systems allow users to maintain a list of other users, called a buddy or contact list, with whom they wish to interact. Using the IM system, a user can send an instant message to any person on their contact list as long as that person is on-line. IM systems typically provide current status information about users on the contact list, telling the contact list owner whether each user on the list is on-line or off-line so that they will know with whom they may interact. This feature is often called presence management. Sending a message to an on-line user opens up a window where each user may type messages that the other user may see, allowing for an electronic "conversation". Many IM systems also provide chat room capability, where a user can set up a chat room to be shared by multiple users. The chat room operates under the same principles as basic instant messaging applied to multiple users, as each user may type in messages for other users in the chat room to see.

The popularity of IM systems is partially based on the immediacy of IM systems, particularly when compared to e-mail. This immediacy requires both parties in an IM exchange to be on-line at the same time, unlike e-mail. It allows, however, for interactive, back-and-forth exchanges of information without having to perform multiple steps to read, reply, and send a reply e-mail.

IM systems typically provide a choice of different status configurations indicating the user's current status. These status indications will be seen by other users from their own IM programs. If a user is active and available for instant messaging, their status will indicate 'active'. If a user is active on the system and desires not to receive instant messages, they may also select a 'do not disturb' status which will tell other users not to transmit instant messages even though the user is on-line. If a user is logged in to the system but will be unable to respond to instant messages, such as when they are in a meeting, they may select an 'away' status. A user may designate a customized 'away' message that provides whatever details a user would like, such as how long the user will be away. If a user is off of the system (logged out, etc.), the instant messaging system will indicate that the user is off-line with no status indicator.

These status indications, particularly the customized 'away' messages, often do not reflect the correct status for the particular user. For example, a user may set their 'away' message indicating that they will be, say, in a meeting for the next hour. The 'away' message will remain the same until it is changed by the user. A user often forgets to reset the 'away' message when they return from their time away, which can be confusing for other users who are receiving false information about where the user is, where the user may be found, or when the user will be back.

There is, therefore, a need for an easy and effective system to facilitate updating of status messages on an instant messaging system. There is an even greater need for such a system when customized 'away' messages are used.

SUMMARY OF THE INVENTION

The problems identified above are in large part addressed by systems, methods and media for updating an instant messaging system on a network. One embodiment provides a method of updating an instant messaging system on a network that generally provides for receiving a request to configure a status indicator of the instant messaging system to an away status for a user, wherein the request to configure the status indicator includes an indication of an 'away' message. The method also generally includes setting the 'away' message and transmitting an indication of the 'away' message to an instant messaging system manager. The method further includes determining that a change in status has occurred and automatically transmitting an indication of the change in status to the instant messaging system manager, which may then update the status of the user.

Another embodiment provides a machine accessible medium containing instructions effective, when executing in a data processing system, to cause the system to perform a series of operations for synchronizing a database on a network. The series of operations generally includes receiving a request to configure a status indicator of the instant messaging system to an away status for a user, wherein the request to configure the status indicator includes an indication of an 'away' message. The series of operations also generally includes setting the 'away' message and transmitting an indication of the 'away' message to an instant messaging system manager. The series of operations further includes determining that a change in status has occurred and automatically transmitting an indication of the change in status to the instant messaging system manager.

A further embodiment provides an instant messaging system on a network. The instant messaging system may include an instant messaging system manager in communication with the network for facilitating instant messaging between users. The instant messaging system may further include a plurality of computer systems in communication with the network having instant messaging clients adapted to receive requests to configure a status indicator to an away status for a user. The instant messaging client may be adapted to determine if a change in the user's status has occurred and to automatically transmit an updated status indicator to the instant messaging system manager.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for updating an instant messaging system on a network are disclosed. More particularly, hardware and/or software components for updating status indicators such as 'away' messages of an instant messaging system are disclosed. Embodiments include determining that a change in status of the user has occurred and automatically transmitting an indication of the change in status to instant messenger system manager via a network. Embodiments include determining that a change in status of the user has occurred based on receiving an indication that the user's status has changed, such as from user input on a keyboard, mouse, etc. Other embodiments include determining that a change-in status has occurred based on determining that the user's status has changed based on an electronic calendar, expiration of a time period, etc.

The disclosed embodiments help prevent outdated 'away' messages for a user that may confuse or mislead other users. By determining that a change in status may have occurred and automatically transmitting an indication of me change in status to an instant messenger system manager in some embodiments, obsolete, incorrect or misleading 'away' messages can be minimized. In some embodiments, little or no action by the user is necessary.

While specific embodiments will be described below with reference to particular configurations of hardware and/or software, those of skill in the art will realize that embodiments of the present invention may advantageously be implemented with other substantially equivalent hardware and/or software systems.

Figure 1:
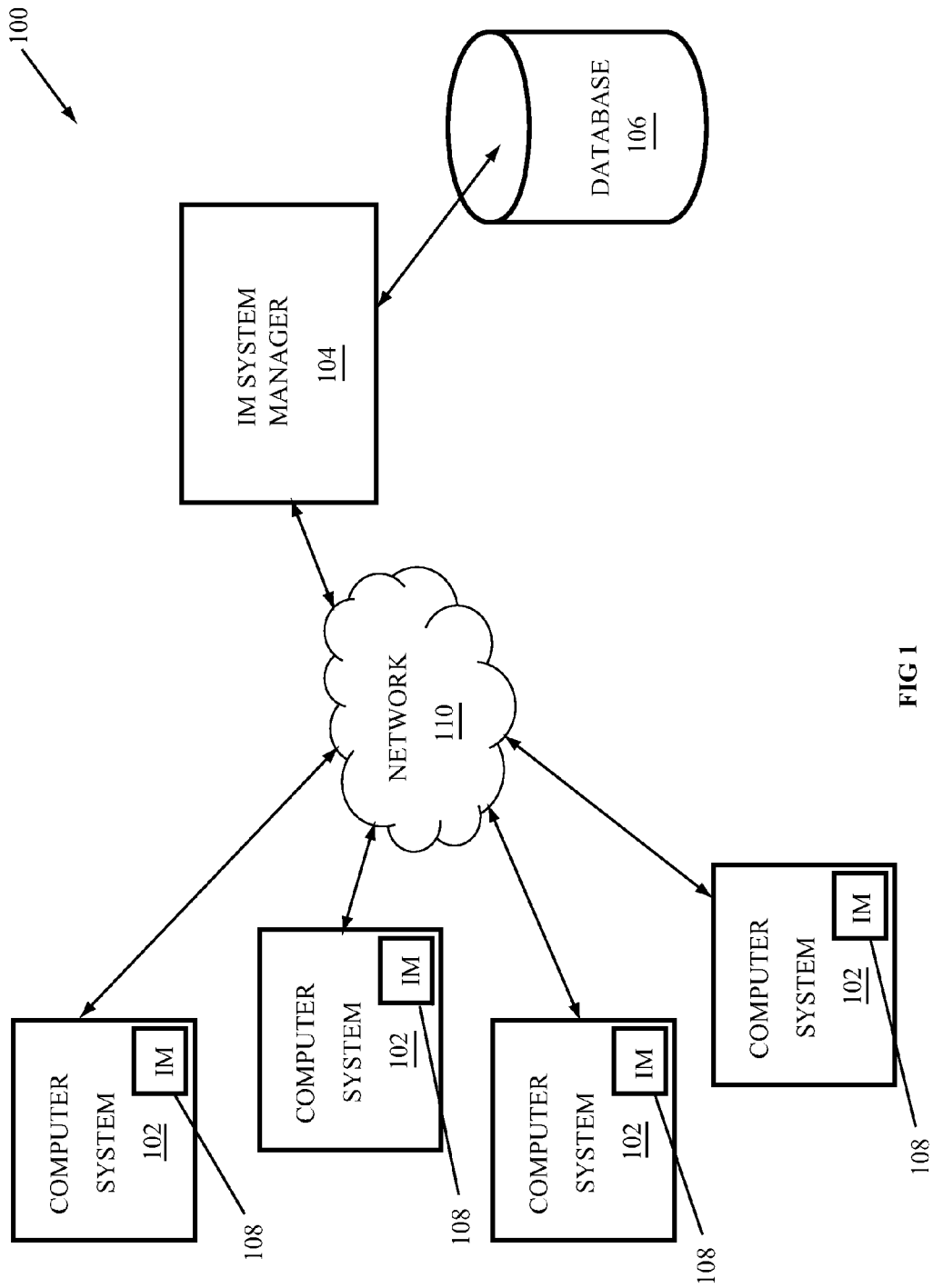
FIG. 1 depicts an environment for a system for updating an instant messaging system according to one embodiment.

Turning now to the drawings, FIG. 1 depicts an environment for a system for updating an instant messaging system according to one embodiment. In the depicted embodiment, system 100 includes a plurality of computer systems 102 in communication with a network 110. System 100 also includes an IM system manager 104 in communication with network 110 for managing the instant messaging system. System 100 may also include database 106 in communication with the IM system manager 104 and/or network 110. In system 100, the computer systems 102, IM system manager 104, and database 106 may be located at the same location, such as in the same building or computer lab, or could be remote. While the term "remote" is used with reference to the distance between the components of system 100, the term is used in the sense of indicating separation of some sort, rather than in the sense of indicating a large physical distance between the systems. For example, any of the components of system 100 may be physically adjacent or located as part of the same computer system in some network arrangements.

Network 110 may be any type of data communications channel, such as the Internet, an intranet, a LAN, a WAN, an Ethernet network, a wireless network, a proprietary network, a broadband cable network, etc. Many instant messaging systems, such as ICQ, utilize the Internet and are open to all. Other IM systems, such as Time Warner Inc.'s AOL Instant Messenger (AIM), use proprietary networks. Semi-private networks are used in some instant messaging systems, such as Microsoft Corp.'s MSN Messenger. Those skilled in the art will recognize, however, that the invention described herein may be, implemented utilizing any type of data communications channel.

Computer systems 102 may include personal computers, workstations, servers, mainframe computers, notebook or laptop computers, desktop computers, PDAs, set-top boxes, mobile phones, wireless devices, or the like. Each computer system 102 may include an instant messaging client (IM client) 108. An IM client 108 may be, in one embodiment, a software application that communicates with an instant messaging server, such as the IM system manager 104. In this embodiment, the IM client 108 may transmit information, such as status messages of a contact list, to the IM system manager 104 and it may receive information as well, such as the current status of IM clients 108 related to other users on the contact list.

IM system manager 104 may be executing on one or more personal computers, workstations, servers, mainframe computers, notebook or laptop computers, desktop computers, PDAs, set-top boxes, mobile phones, wireless device, or the like. In one embodiment, an IM system manager 104 may be a server in communication with a plurality of computer systems 102 via network 110. IM system manager 104 facilitates instant messaging between IM clients 108 on different computer systems 102 by transmitting and receiving information, such as the identification, status, and/or network address of IM clients 108 and/or computer systems 102. Many different IM system manager 104 applications exist, such as ICQ, AIM, MSN Messenger, Yahoo! Messenger, etc. Optional database 106 may provide storage for any type of information for the IM system manager 104, such as information about IM clients 108, network addresses, etc. Database 106 may be located anywhere within system 100, including as a standalone database, as part of the IM system manager 104, etc., and may be stored on any type of storage device, such as hard drives, volatile memory, etc.

In one embodiment, a user on a computer system 102 may open an IM client 108 so that it is executing on the computer system 102. The IM client 108 then attempts to connect to the IM system manager 104 using network 110. Using the IM client 108, the user then typically enters a user name (or other identification) to log in to the IM system manager 104. In this embodiment, the IM client 108 then transmits connection information (such as the IP address and port number assigned to IM client 108 on computer system 102, as well as a contact list, etc.) of the computer system 102 on which the IM client 108 is located. The IM system manager 104 may then determine if any users from the contact list are currently logged in (i.e., their IM client 108 is active and running), after which it will transmit status information (as well as IP address and port number) for users on the contact list back to the initial IM client 108, as well as transmitting status information ('active') for the initial IM client 108 to the users in the contact list. Status information for each user may be stored at the IM system manager 104 and/or database 106.

The user may then use their IM client 108 to select one of the active users from their contact list. The IM client 108 then opens a window that provides a direct connection to the selected user's IM client 108, bypassing the IM system manager 104. The direct connection is possible because the initiating IM client 108 has the connection information, such as the IP address and port number, for the other IM client 108 or computer system 102. Each user's instant messages may appear in the open window, which is then displayed on both computer systems 102. When either user logs off the IM system manager 104, the IM system manager 104 changes the status of that user to 'away' and transmits the updated status information to other users.

In this embodiment, a user using the IM client 108 may see a list of all of their contacts or buddies and the status of each. The status of each contact may be 'active', 'away', 'do not disturb', or off-line, as described previously. Some, of the 'away' statuses may include 'away' messages, which are user-configurable or automatically generated messages that provide additional information as to the status of the user beyond simply that they are away or unavailable. 'Away' message is used as a general term to indicate a message that provides any indication that a user is not available for instant messaging. In one example, an 'away' message may indicate that the user is in a meeting for two hours and will not be active on the instant messaging system during that time. In another example, an 'away' message may indicate that a user will be away from their computer for the rest of the afternoon. In both of these examples, a user may very easily forget that their 'away' message is configured in this way when they return to their computer, possibly misleading other users. Even after they log back in to the IM system manager 104 (becoming 'active' again) and later log back out, their 'away' message will remain the same unless they actively change it, resulting in additional confusion.

An 'away' status may also include the off-line status in one embodiment. In this embodiment, when a user is logged off the IM system an 'away' message may be stored on the IM system manager 104 or database 106 during the off-line timeframe, instead of having the IM system provide an off-line indication with no status. This allows the 'away' message methodology described herein to be applied to the off-line status as well, or any other status indication.

Disclosed embodiments address this issue and provide an automatic way of updating the status indicator of a user, particularly the 'away' message. In one embodiment, a user sets a particular 'away' message (of it is automatically generated) and logs off the IM system manager 104. If the user becomes active again on their computer system 102, the IM client 108 may reset the 'away' message and transmit the new status, including the reset 'away' message, to the IM system manager 104 so that other users, do not receive outdated information. The user may be considered active again on the computer system if they use the keyboard, mouse, pointer, pen, voice command device, or other user input devices, or if they initiate an instant message or chat. In another embodiment, the IM client 108 may interface, with a calendar program to receive more accurate status information for the user and may reset the 'away' message based on the user's calendar program. These and other embodiments provide a more accurate 'away' message for a user on an instant messaging system.

Figure 2:
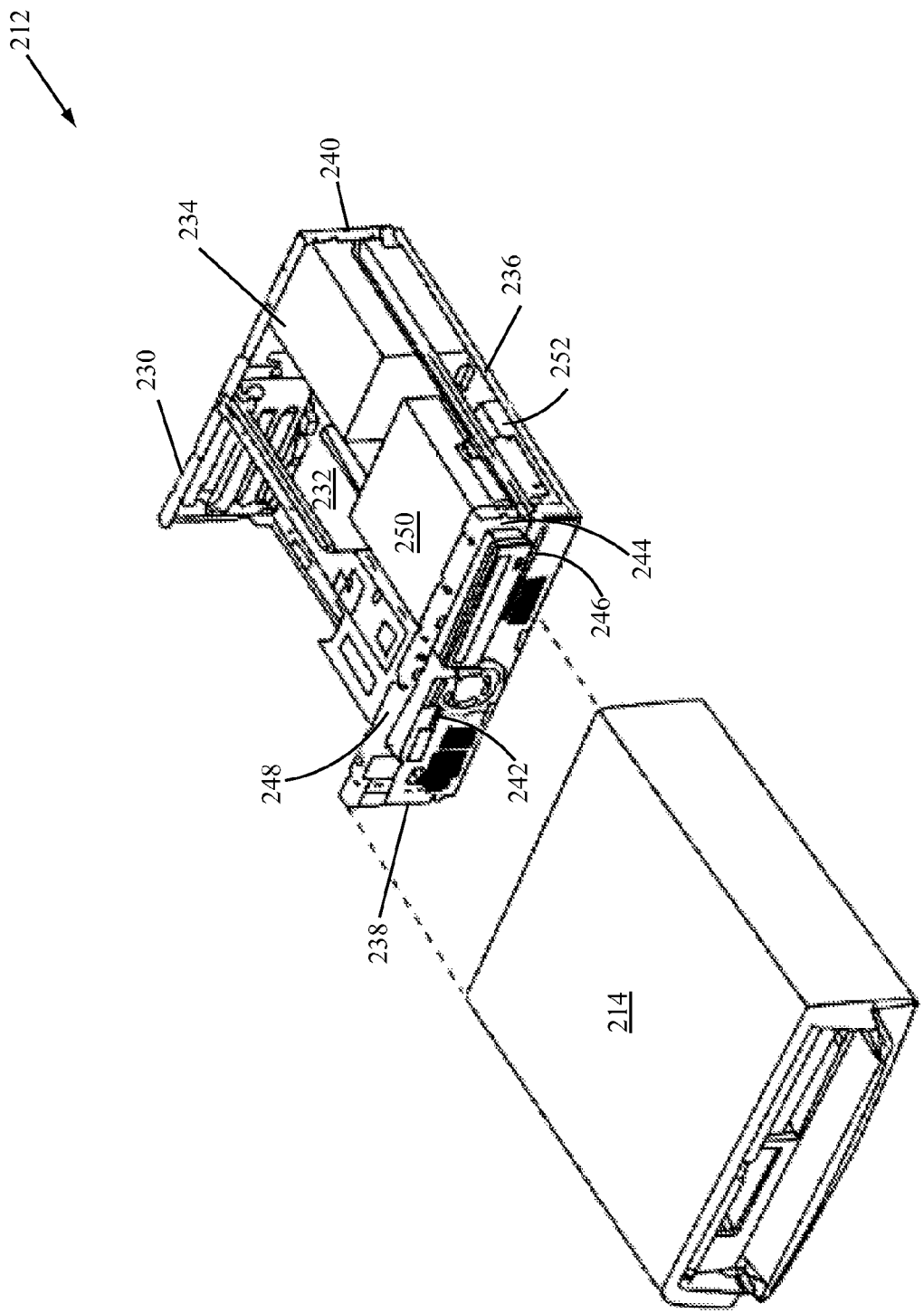
FIG. 2 depicts an exploded perspective view of certain elements of a processing device such as a personal computer, including a chassis, a cover, and a planar board.
Figure 3:
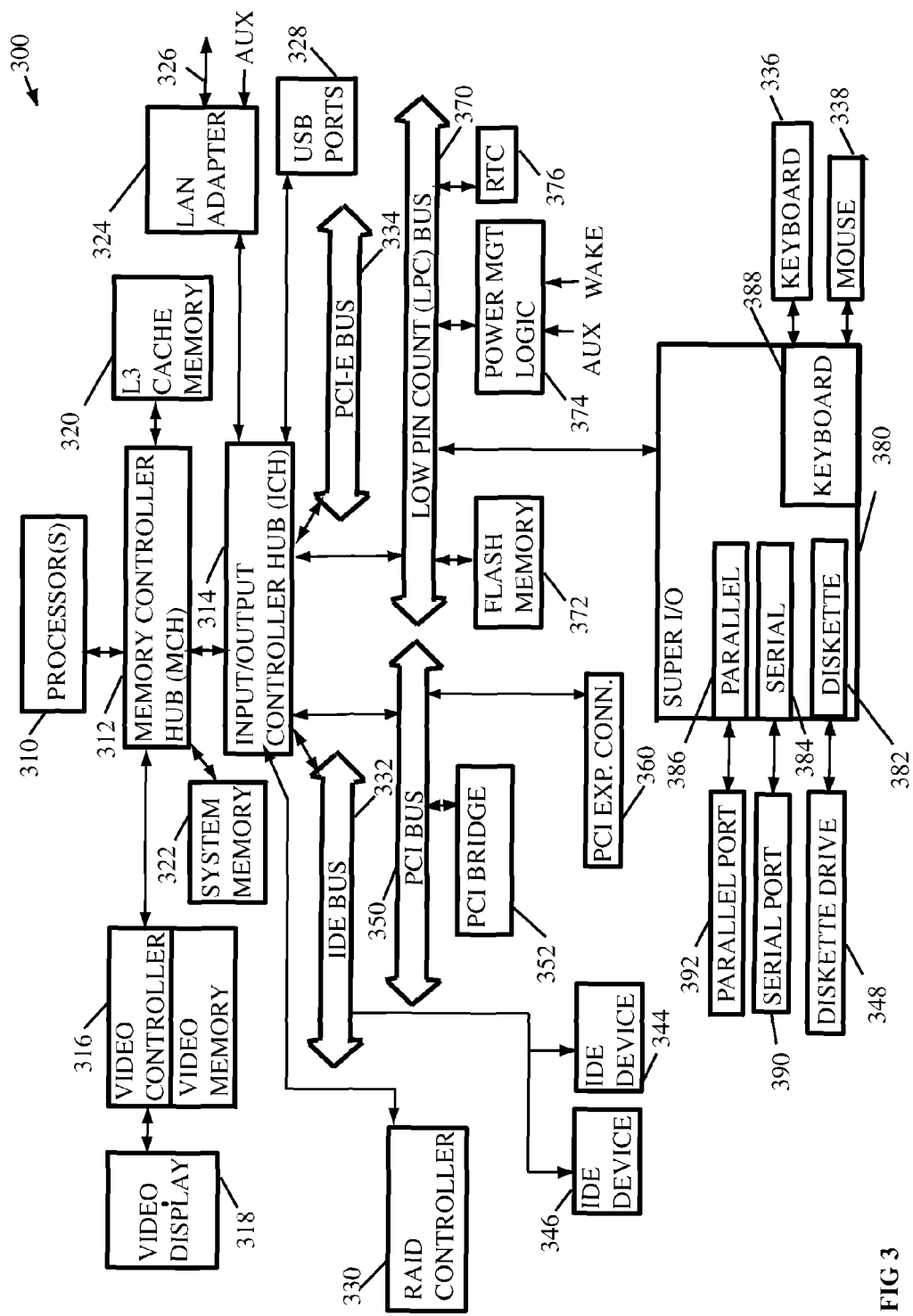
FIG. 3 depicts a block diagram of certain components of the processing device of FIG. 2.

FIGS. 2 and 3 depict one embodiment of a personal computer 212 suitable for use as, for example, a computer system 102 or an IM system manager 104 in one embodiment. Other possibilities for the computer system 102 or IM system manager 104 are possible, including a computer having capabilities other than those ascribed herein to a "personal computer", and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like.

FIG. 2 depicts an exploded perspective view of certain elements of a personal computer 212 according to one embodiment, including a chassis 230, a cover 214, and a planar board 232. Cover 214 is a decorative outer member that cooperates with a chassis 230 in defining an enclosed, shielded interior volume for receiving electrically powered data processing and storage components to process and store digital data. At least certain of these components may be mounted on a multi-layer planar 232 or motherboard which may be mounted on the chassis 230 and may provide a means for electrically interconnecting the components of the personal computer 212, including those identified above and such other associated elements as floppy disk drives, various forms of direct access storage devices, accessory adapter cards or boards, and the like.

Personal computer 212 may have a power supply 234 that may be actuated by a power switch (not shown). The chassis 230 may have a base indicated at 236, a front panel indicated at 238, and a rear panel indicated at 240. The front panel 238 may define at least one open bay for receiving a data/storage device such as a disk drive for magnetic or optical disks, a tape backup drive, or the like.

In the illustrated form, a pair of upper bays 242, 244 and a lower bay 246 are provided. One of the upper bays 242 may be adapted to receive peripheral drives of a first size (such as those known as 3.5 inch drives) while the other 244 may be adapted to receive drives of a different size (such as a CD-ROM or DVD-ROM drive) while the lower bay may be adapted to receive another drive. One floppy disk drive indicated at 248 maybe a removable medium direct access storage device (DASD) capable of receiving a diskette inserted there into and using the diskette to receive, store and deliver data as is generally known. One CD-ROM drive indicated at 250 is a removable medium DASD capable of receiving a compact disc inserted there into and using the disc to deliver data as is generally known. One hard disk drive is indicated at 252 and is a fixed medium DASD capable of storing and delivering data as is generally known.

Referring now to FIG. 3, there is shown a block diagram 300 of certain components of the personal computer 212 of FIG. 2. The components of FIG. 3 comprise components mounted on the planar 232 of other hardware of the personal computer 212. Connected to the planar 232 is the system CPUs of processor(s) 310, which may be connected directly to a memory controller hub (MCH) 312. As one example, the system processor(s) 310 could be an Intel Pentium processor, Cyrix 586-P75 processor or Advanced Micro Devices 8486 processor or any other suitable processor.

MCH 312 and input-output (I/O) controller hub (ICH) 314 represent part of the personal computer's 212 core logic chipset, facilitating access to/from processor(s) 310 from/to memory devices and I/O devices, respectively. More specifically, MCH 312 may provide access to system memory 322 and level three (L3) cache memory 320. In many such embodiments, level one (L1) and level two (L2) cache are incorporated into each processor of processor(s) 310. MCH 312 may also include a special bus adapted for direct memory access (DMA) by a video controller. In other embodiments, a peripheral component interconnect (PCI) bus such as a PCI-E bus may be implemented for video display 318. System memory 322 may include random access memory (RAM) such as double data rate (DDR) synchronous dynamic random access memory (SDRAM).

Input/Output Controller Hub (ICH) 314 may be designed to coordinate communications with various I/O devices. In the depicted embodiment, ICH 314 couples with local area network (LAN) adapter 324, universal serial bus (USB) ports 328, redundant array of independent disks (RAID) controller 330, integrated drive electronics (IDE) bus 332, PCI Express (PCI-E) bus 334, PCI bus 350, and low pin count (LPC)bus 370. LAN adapter 324 may be coupled to either the PCI bus 350 or directly to ICH 314 to facilitate communication (i.e., transmit/receive data) with a remote computer or server over a LAN via a connection or link 326. LAN adapter 324 may be a card to be plugged in personal computer 212 or a LAN connection embedded on the planar 232. LAN adapter 324 may also be known as a network interface card (NIC).

Personal computer 212 may include one or more USB ports 328, which are hardware interfaces for peripherals such as the keyboard, mouse, joystick, scanner, printer, telephony devices, hard drives, compact disk (CD) drives, digital video disk (DVD) drives, and the like. Personal computer 212 may also include a RAID controller 330, which is a controller for a disk subsystem that is used to increase performance or provide fault tolerance.

IDE bus 332 and PCI-E bus 334 may be incorporated to facilitate connection of additional I/O devices with ICH 314. IDE bus 332 is a type of hardware interface widely used to connect hard disks, CD-ROMs and tape drives to a PC. IDE bus 332 provides for the attachment for hard disk drive 344 and CD-ROM drive 346. PCI-E bus 334 may be a high-speed peripheral interconnect. PCI-E bus is designed to match the higher speeds of CPUs and can accommodate Gigabit and 10 Gigabit Ethernet and even support chip-to-chip transfers. PCI bus 350 may Couple a PCI bridge 352 to facilitate the connection of additional PCI devices and a PCI expansion connector 360 to facilitate expansion of the PCI bus 350 so even more peripheral devices can communicate with ICH 314 via PCI bus compatible peripheral cards.

Attached to the LPC 370 may be a flash memory (FM) module or chip 372, power management logic 374, and a real-time clock (RTC) 376, and a multi-function or super I/O controller 380. Flash memory module 372 contains microcode that personal computer 212 may execute on power on and may be a non-volatile memory module or chip. Power management logic 374 allows for changing between various power states (e.g., off, suspend and normal operating states). The real-time clock (RTC) 376 may be used for time of day calculations. Super I/O controller 380 may include functionality such as, for example, a National Semiconductor PC87307. The super I/O controller 380 may contain a variety of I/O adapters and other components such as the diskette adapter 382, serial adapter 384, a parallel adapter 386 and keyboard controller 388. The diskette adapter 382 provides the interface to the diskette drive 348. The serial adapter 384 has an external port connector, serial port 390, for attachment of external devices such as modems (not shown). The parallel adapter 386 has an external port connector, parallel port 392, for attachment of external devices such as printers (not shown). The keyboard controller 388 is the interface for the connectors, keyboard 336 and mouse 338.

Figure 4:
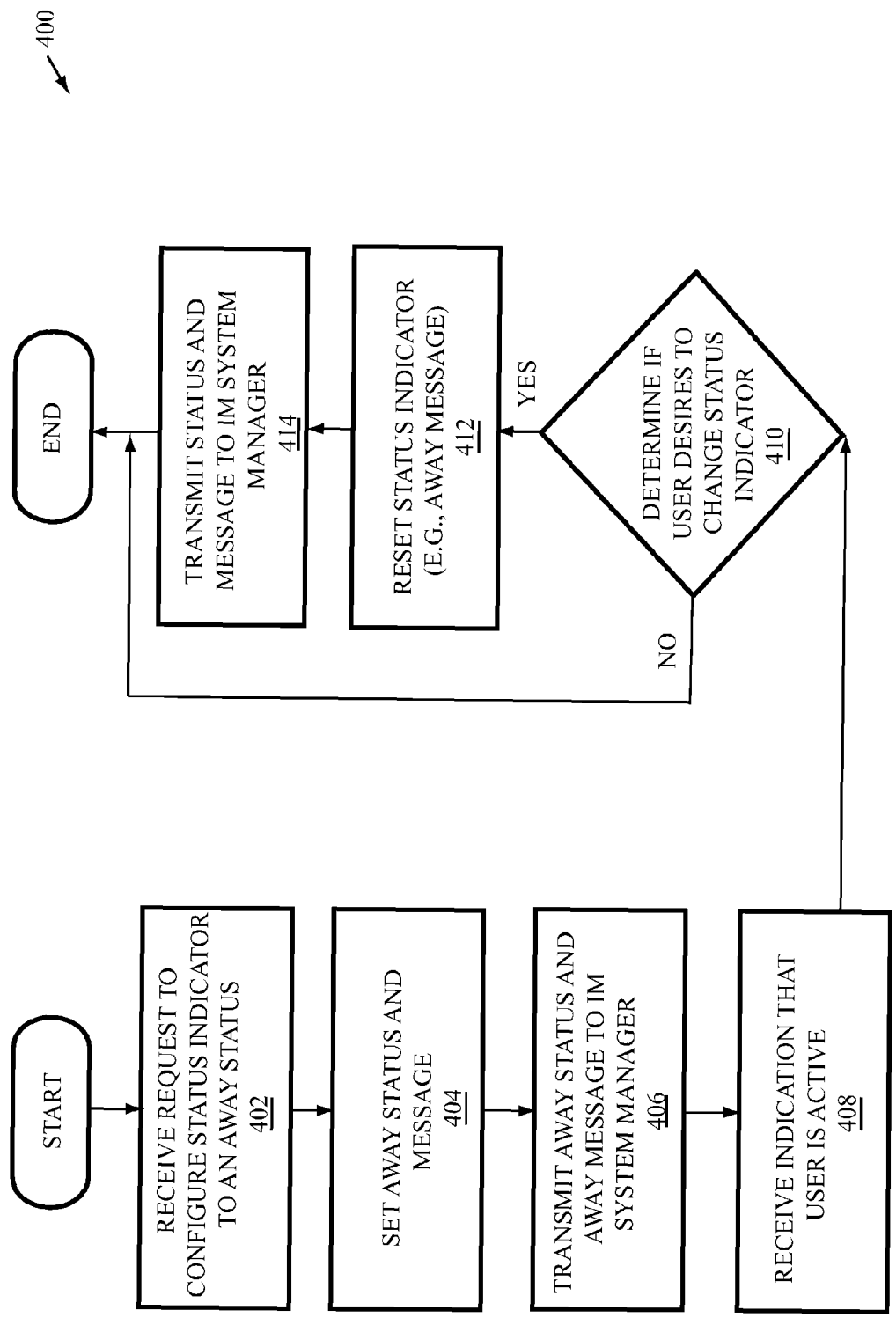
FIG. 4 depicts an example of a flow chart for updating the status of a user on an instant messaging system according to one embodiment.

FIG. 4 depicts an example of a flow chart 400 for updating the status of a user on an instant messaging system according to one embodiment. The method of flow chart 400 may be performed, in one embodiment, by an IM client 108 executing on a computer system 102. Flow chart 400 begins with element 402, receiving a request to configure a status indicator to an away status. In one embodiment of this element, an IM client 108 receives a request from a user to configure the status indicator to an away status. A user may make such a request by selecting an away status from a pull down menu or any other input method. The user may optionally select an away status that may be, automatically updated (such as described in this FIG. 4) from a list of statuses that includes any methodologies for updating away status or not updating away status at all. Flow chart 400 continues to element 404, where the away status and 'away' message are set based on the input received in element 402.

In one embodiment, a user may also input an 'away' message, such as by typing the 'away' message on a keyboard, via/voice input device, by selecting standard or commonly-used 'away' messages from a list, or any other means. As described previously, the 'away' message may contain information about the status of the user, such as where they are, what time they will be back on-line, how they may be reached, etc.

Flowchart 400 continues to element 406, transmitting away status, including 'away' message, to the IM system manager 104. After receiving the status and message from IM client 108, the IM system manager 104 will update its status for the user or IM client 108 in one embodiment. The IM system manager 104 may store status information locally, in database 106, in permanent of temporary storage, etc. Status information, including 'away' messages or the like, may be organized by user, by IM client 108, by computer system 102, or in any fashion, but organization based on the user (and the user's login name-or identification) may be particularly useful.

In element 408, an indication that the user is active is received. In one embodiment, the indication is received by the IM client 108 operating on a computer system 102. In this embodiment, a user input on the computer system provides an indication that the user is active, such as input from a user input device (i.e., keyboard, mouse, pen, pointer, voice, etc.). In an alternative embodiment, actions taken by the user may serve as indication that the user is active, such as the user opening the IM client 108, typing in characters in a chat window, sending or responding to an instant message, logging in to the computer or the IM client 108, etc. Any indication of user activity is possible, such as detection of the user's physical presence, or any indirect indication of activity of a user, such as the expiration of a time period (as a proxy for when the user is supposed to be active), electronic calendar entries, or any other indirect methods described in relation to FIGS. 5 and 7. The expiration of a time period may be particularly useful for when a user has an estimate of how long they will be unavailable (e.g., going on a one week vacation, two hour meeting, etc.) so that they can input the estimate and have the 'away' message indicating that their time away lasts only that long.

In one alternative embodiment, element 408 is not performed until a period of time has passed. This alternative allows for a period of time to pass to allow the user to finish what they were doing, lock their computer, or otherwise exit the computer system 102. Such a delay serves to reduce the risk of "false alarms" that incorrectly indicate that the user is back and active again when they have not yet really been away. The period of time may be a standard time (e.g., always five minutes), user-configurable, etc. In an alternative embodiment, element 408 is not performed until the occurrence of an event, such as closing the IM client 108, exiting computer system 102, activation of a screen saver on the computer system 102, etc.

Flowchart 400 continues to optional decision block 410, where it is determined if the user desires to change the status indicator to an active status. In one embodiment, the user is queried whether they wish to update their status indicator after it is determined that the user is active again in element 408. In this embodiment, the user may be queried via a pop-up window or other user interface methodology by the IM client 108, computer system 102, etc. The user may be allowed to choose between different alternatives, such as active status, different 'away' messages, do not disturb status, etc. The user may also, in other embodiments, choose to delay making the choice, such as by choosing an option to be queried again in a period of time (such as a default, user-defined, etc. period of time). In an alternative embodiment, decision block 410 is not necessary and it is simply assumed that the user desires to update their status indicator and the flowchart continues to element 412. This embodiment is functionally equivalent to the answer of decision block 410 always being "yes".

If it is determined that the user desires to, change the status indicator (or if decision block 410 is simply not performed), the flowchart 400 continues to element 412, resetting the status indicator. After the status indicator is reset, the method continues to element 414, transmitting the status indicator to the IM system manager 104, after which the method terminates. The IM system manager 104 may store the hew status information, update its records, transmit the new status information to other users (such as those on the initial user's contact list), etc., just as it would with any status indicators.

Element 412 allows for the status indicator to be reset in a variety of ways. In one embodiment, element 412 may be accomplished by the IM client 108 resetting the status indicator to a default 'away' message. In this embodiment, the default message replaces a customized 'away' message the user may have chosen, preventing confusion from other users seeing an outdated 'away' message. Alternatively, a new customized 'away' message may be chosen. In another embodiment, the IM client 108 may reset the status indicator to an active status. In many cases, this may bean accurate status, as element 412 is only reached when an indication that the user is active in element 408. In yet another alternative embodiment, the status indicator may be reset to an option chosen by the user in decision block 410.

Figure 5:
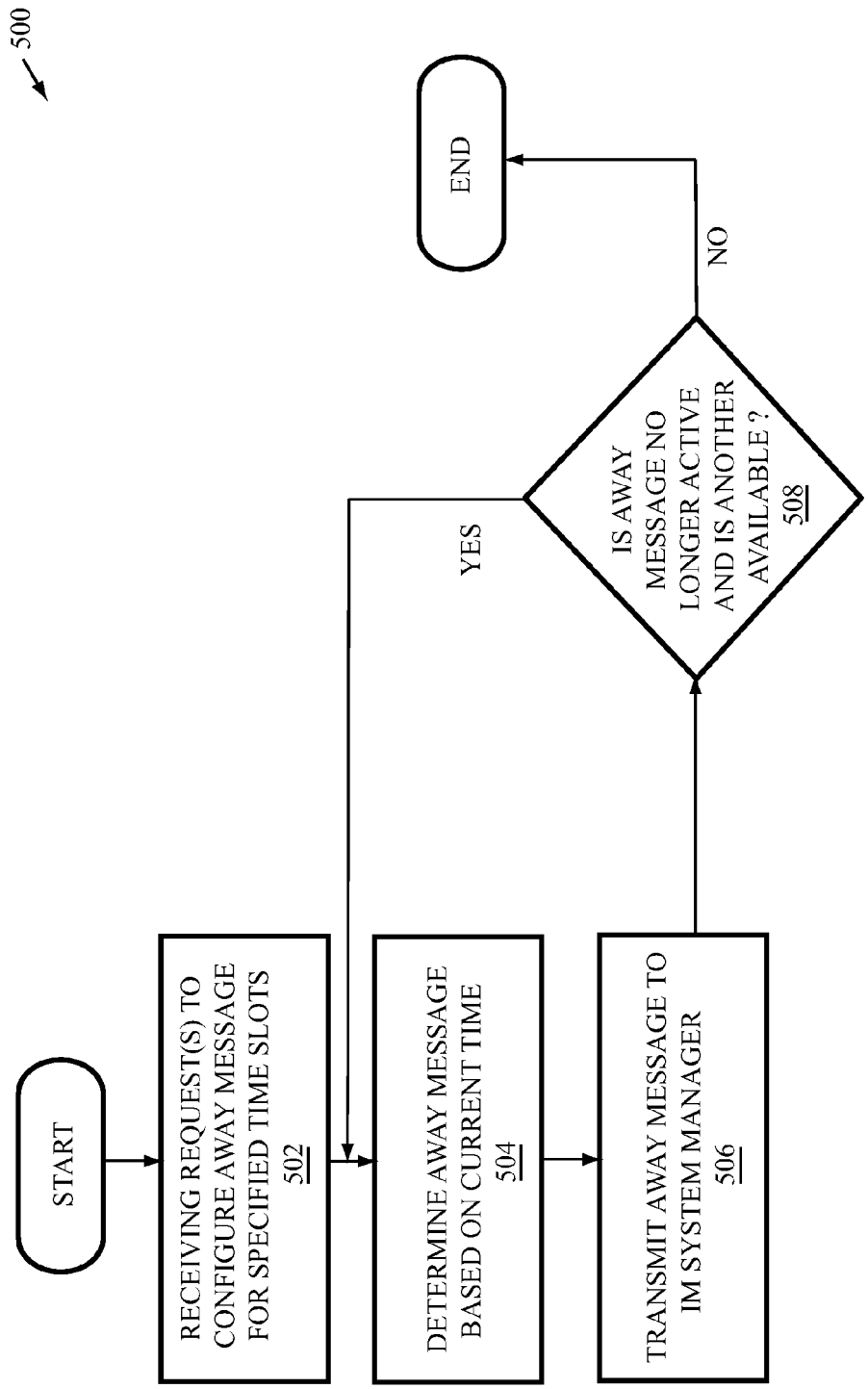
FIG. 5 depicts an example of a flow chart for updating the status of a user on an instant messaging system according to an alternative embodiment.

FIG. 5 depicts an example of a flow chart 500 for updating the status of a user on an instant messaging system according to an alternative embodiment. In this embodiment, users may configure any number of 'away' messages to be displayed based on an associated time slot for each. The function of flow chart 500 may be performed on an IM client 108, computer system 102, or other system. In element 502, one or more 'away' messages are received, each with an associated time slot during which it should be used, where each time slot may have a start time and an end time. A queue of 'away' messages may thus be created, providing for a series of 'away' messages. One example of this queue would be an 'away' message that was listed as a first time slot that said "I'm unavailable and in a meeting" that had start and stop times of 3 p.m. and 4 p.m., respectively, and another 'away' message in a second time slot from 4 p.m. to 4:30 p.m. that said "Out of office running errands". Users may select a time slot, such as from a pull-down menu, for each 'away' message. The user entry mechanism may prevent overlap of 'away' messages or, in an alternative embodiment, it may allow overlapping 'away' messages and utilize any type of methodology to resolve conflicts, such as based on priority, which message started earliest, alphabetical order, etc.

Flow chart 500 continues to element 504, determining the appropriate 'away' message. In element 504, the method analyzes the 'away' messages received in element 502 and determines which of them should be used based on the current time (and time conflict resolution methodology, if relevant). The operation of element 504 is described in more detail in relation to FIG. 6. In element 506, the method transmits the 'away' message determined in element 504 to the IM system manager 104. The IM system manager 104 may store the new status information, update its records, transmit the new status information to other users (such as those on the initial user's contact list), etc. In one embodiment, the newly determined 'away' message is ultimately transmitted to other users from the contact list so that each user has the most current status information. The method continues to decision block 508, determining if the 'away' message is no longer active and, if not, whether another 'away' message is available. If the current 'away' message is no longer active (i.e., the timeframe has expired) and another 'away' message is available, the flow chart returns to element 504, where a new 'away' message is determined. If no new 'away' messages are available, flow chart 500 terminates, leaving the last 'away' message as the current status indicator.

In one embodiment, the functions of flow charts 400 and 500 may be combined. In this embodiment, a user may set up a series of 'away' messages, for example, as in flow chart 500 while the IM client 108 continues to search for indications of user activity, as in flow chart 400. In this embodiment, the user gets the benefit of customized 'away' messages for different timeframes in addition to functionality that helps eliminate inadvertently leaving an 'away' message in place long after it is accurate.

Figure 6:
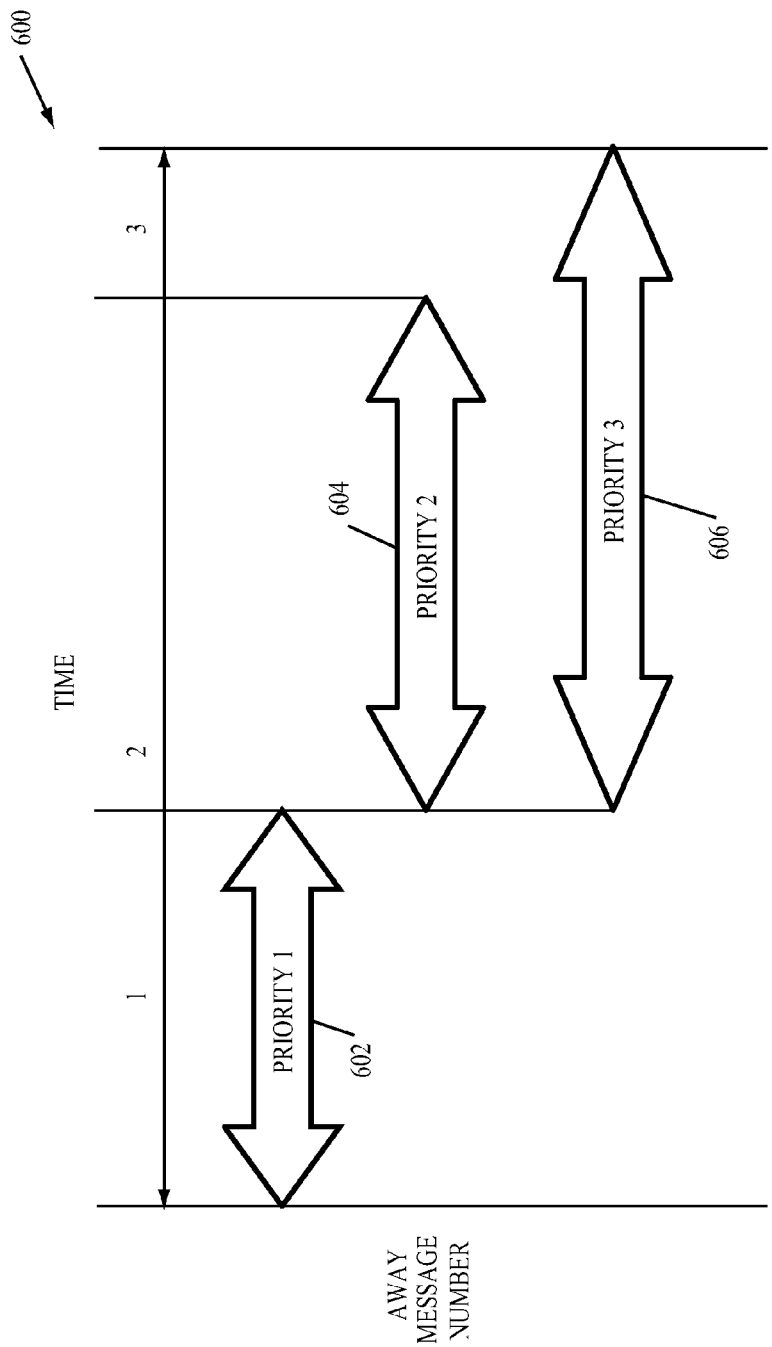
FIG. 6 depicts a schematic of an 'away' message priority and time methodology of the method of FIG. 5 according to one embodiment.

FIG. 6 depicts a schematic of an 'away' message priority and time methodology of the method of FIG. 5 according to one embodiment. The schematic 600 illustrates an example of the methodology of element 504 of FIG. 4. Schematic 600 includes two axes, one for time and one for 'away' message number. The time axis includes different time regions 1, 2, and 3. 'Away' messages 602, 604, and 606 are represented by arrows with their optional priority written within the arrow (lower numbers being higher priority) and with the end of the arrows indicating the start and stop times of the time slot for the 'away' messages 602, 604, and 606. In one embodiment, element 504 of FIG. 5 chooses the selected 'away' message based on the current time. In this embodiment, and applied to schematic 600, 'away' message 602 would be the selected 'away' message during time period 1, as it is the 'away' message whose time slot covers that timeframe. During time period 2 after the time slot for 'away' message 602 expires, 'away' message 604 would be chosen over 'away' message 606, as it has a higher priority. 'Away' message 606 would be chosen during timeframe 3 as 'away' message 604 expires. This embodiment may be particularly useful when a user has a complicated schedule with overlapping commitments.

Schematic 600 only shows one embodiment of the methodology of element 504, and other methodologies are possible. As described above, methodologies using only assigned time slots are possible, such as when users may not enter 'away' messages without conflicting time slots, as well as customized methodologies that may be based on user preferences, the intended recipients of the statuses (i.e., different 'away' messages for people outside the company), etc.

Figure 7:
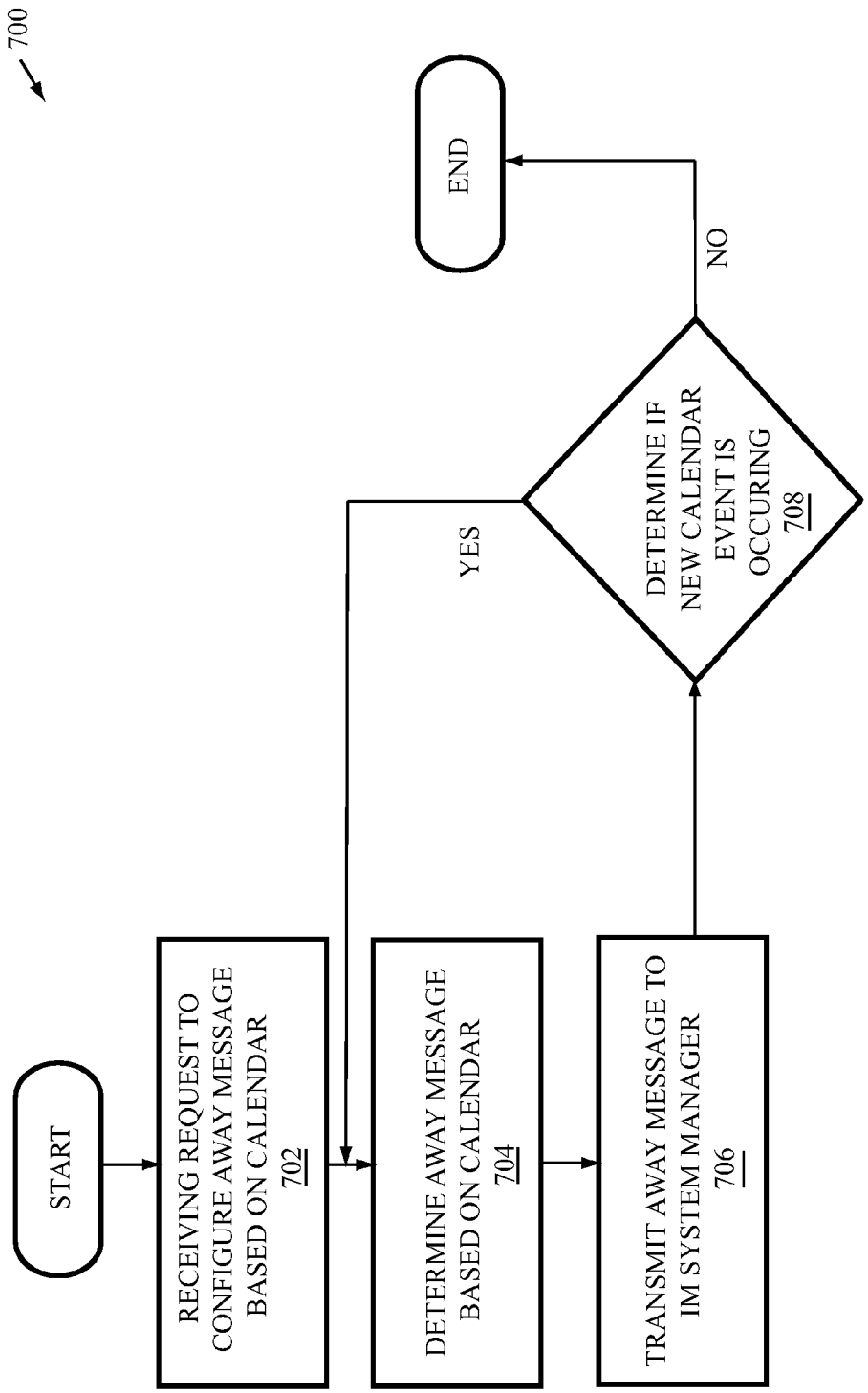
FIG. 7 depicts a flow chart example for updating the status of a user on an instant messaging system according to another alternative embodiment.

FIG. 7 depicts a flow chart example for updating the status of a user on an instant messaging system according to another alternative embodiment. In this embodiment, the 'away' messages may be configured based on an electronic calendar. The function of flow chart 700 may be performed by an IM client 108 on a computer system 102, in one example, that may be in communication with an electronic calendar, which may be on the computer system 102 or accessible using network 110. In element 702, the method receives a request to configure 'away' messages based on an electronic calendar. Any electronic calendar may be used, such as Microsoft Corporation's Outlook, Yahoo! Inc.'s Calendar, etc. The request is typically received from a user, and may be selected by the user from a pull-down menu or other data entry method. The IM client 508 and electronic calendar may also be integrated into one program.

Flow chart 700 continues to element 704, determining the 'away' message based on the electronic calendar. In this element, the IM client 108 may interpret information from the electronic calendar in order to determine an appropriate 'away' message. In one embodiment, for example, the header, title or subject line of calendar entries may be used as the 'away' message. The IM client 108 may use the current time to determine which calendar entry is applicable. In another embodiment, some calendar entries may be private such that the header, title, of subject line should not be displayed. In this case, a default "private appointment" or other message may be used as the 'away' message. If the calendar does not have an entry for the current time, then the 'away' message may default back to a standard or user-configurable default 'away' message. In an alternative embodiment, the priority-based alternative methodology of FIGS. 5 and 6 is used with calendar entries replacing the user-configured 'away' messages. For example, each calendar entry could have an associated priority that may be used to determine which should be used for an 'away' message when calendar entries overlap with respect to time. Any methodology may be used to determine an 'away' message based on the electronic calendar.

In element 106, the method transmits the 'away' message determined in element 704 to the IM system manager 104. The IM system manager 104 may store the new status information, update its records, transmit the new status information to other users (such as those on the initial user's contact list), etc. In one embodiment, the newly determined 'away' message is ultimately transmitted to other users from the contact list so that each user has the most current status information. The method continues to decision block 708, determining if a new calendar event is occurring. If a new calendar event is occurring (i.e., enough time has passed that a new calendar entry is now relevant), the flow chart returns to element 704, where the new 'away' message is determined. If the calendar events are completed, flow chart 700 terminates, leaving the last 'away' message as the current status indicator.

In one embodiment, the functions of flow charts 400, 500 and 700 may be combined. In this embodiment, an electronic calendar may be used to determine 'away' messages, for example, as in flow chart 700 while the IM client 108 continues to search for indications of user activity, as in flow chart 400. In this embodiment, the user gets the benefit of using their electronic calendar to create customized 'away' messages in addition to the functionality that helps eliminate inadvertently leaving an 'away' message in place long after it is accurate.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for synchronizing a database on a network, particularly where inputs to the database derive from computer systems behind a firewall. It is understood that the form of the invention shown and described in the detailed description and the drawings are to be taken merely as examples. It is intended that the following claims be interpreted broadly to embrace all the variations of the example embodiments disclosed.

What is claimed is:

1. A computer readable storage device having a computer readable program stored thereon, the computer readable program comprising program instructions which, when executed by one or more processors, perform a method for updating an instant messaging server on a network, the method comprising:

receiving, in an instant messaging client, a request to configure a status indicator to an away status for a user of the instant messaging client, wherein the request to configure the status indicator includes an indication of an 'away' message, wherein the user belongs to a particular organization, and wherein the 'away' message comprises a first message for other users who belong to the particular organization and a second, different message for other users who do not belong to the particular organization;

setting the 'away' message;

transmitting the 'away' message to the instant messaging server via the network;

after the transmitting the 'away' message, detecting an activation of a screen saver;

after the detecting the activation of the screen saver, receiving an indication that the user is active while the status indicator is in the away status;

after the receiving the indication that the user is active, determining that a change in status of the user has occurred; and after the determining that the change in status has occurred, querying the user as to whether the user desires to change the status indicator to an active status, and in response to receiving an affirmative response from the user, automatically transmitting an indication of the change in status to the instant messaging server via the network.

2. The computer readable storage device of claim 1, wherein the determining that the change in status has occurred comprises determining that the user is active; and wherein the indication of the change in status is an indication of an active status.

3. The computer readable storage device of claim 1, wherein the indication of the change in status includes a new 'away' message.

4. The computer readable storage device of claim 1, wherein the indication of a change in status is an indication of an 'away' message selected from a plurality of 'away' messages based on a current time.

5. An instant messaging system on a network, the system comprising:

an instant messaging server in communication with the network, the instant messaging server being adapted to facilitate instant messaging between users belonging to a particular organization;

a plurality of computer systems in communication with the network, at least one computer system having an instant messaging client to receive requests to configure a status indicator to an away status for a user, wherein the away status includes an 'away' message that itself comprises a first message for other users who belong to the particular organization and a second, different message for other users who do not belong to the particular organization;

wherein the instant messaging client, after detecting an activation of a screen saver and after receiving an indication that the user is active while the status indicator is in an away status, determines if a change in the user's status has occurred, and wherein further the instant messaging client automatically transmits an updated status indicator to the instant messaging server after determining that the change in status has occurred and after querying the user to determine if the user desires to change the status indicator to active and receiving an affirmative response.

6. The system of claim 5, wherein the change in status is from an away status to an active status.

7. A computer system comprising one or more computer readable storage devices, one or more processors, one or more computer readable memories, and a computer readable program stored on at least one of the one or more computer readable storage devices, the computer readable program comprising program instructions which, when executed by at least one of the one or more processors via at least one of the one or more computer readable memories, perform a method for updating an instant messaging server on a network, the method comprising:

receiving, in an instant messaging client, a request to configure a status indicator to an away status for a user of the instant messaging client, wherein the request to configure the status indicator includes an indication of an 'away' message, wherein the user belongs to a particular organization, and wherein the 'away' message comprises a first message for other users who belong to the particular organization and a second, different message for other users who do not belong to the particular organization;

setting the 'away' message;

transmitting the 'away' message to the instant messaging server via the network;

after the transmitting the 'away' message, detecting an activation of a screen saver;

after the detecting the activation of the screen saver, receiving an indication that the user is active while the status indicator is in the away status;

after the receiving the indication that the user is active, determining that a change in status of the user has occurred;

after the determining that the change in status has occurred, querying the user as to whether the user desires to change the status indicator to an active status, and in response to receiving an affirmative response from the user, automatically transmitting an indication of the change in status to the instant messaging server via the network.

8. The computer system of claim 7, wherein the determining that the change in status has occurred comprises determining that the user is active; and wherein the indication of the change in status is an indication of an active status.

9. The computer system of claim 7, wherein the indication of the change in status includes a new 'away' message.

10. The computer system of claim 7, wherein the indication of a change in status is an indication of an 'away' message selected from a plurality of 'away' messages based on a current time.

* * * * *